United States Patent Office 3,328,490
Patented June 27, 1967

3,328,490
MIXTURE OF POSTCHLORINATED ATACTIC AND EUTACTIC POLYVINYLCHLORIDES
Robert Buning, Oberlar, Karl-Heinz Diessel, Troisdorf, and Hans-Ewald Konermann and Bernhard Kraemer, Oberlar, Germany, assignors to Dynamit Nobel A.G., Cologne, Germany, a corporation of Germany
No Drawing. Filed Dec. 7, 1964, Ser. No. 416,975
Claims priority, application Germany, Dec. 7, 1963, D 43,121
4 Claims. (Cl. 260—899)

This invention relates to plastic mixtures on a basis of postchlorinated atactic polyvinylchloride. More particularly, it relates to plastic mixtures of postchlorinated atactic polyvinylchloride and postchlorinated eutactic polyvinylchloride. The invention is also concerned with a method of reducing the brittleness of postchlorinated polyvinylchloride.

Broadly considered, the invention involves compositions of the above-mentioned nature which contain as two of their constituents postchlorinated atactic polyvinylchloride and postchlorinated eutactic polyvinylchloride. It is well known that postchlorinated polyvinylchloride is a relatively brittle plastic. Numerous proposals have been advanced for reducing the brittleness of postchlorinated polyvinylchloride as, for example, the addition thereto of emulsifying agents. The plastics thereby produced have the disadvantage of a greatly reduced thermal stability. Furthermore, the tensile strengths of such plastics are greatly reduced.

The additives proposed heretofore for improving the impact strength of postchlorinated polyvinylchloride are of a chemically different structure from that of the postchlorinated polyvinylchloride so that difficulties arise in the working of the mixtures as, for example, on the roller mixers, due to poor compatibility.

Among the objects of the present invention is the provision of postchlorinated polyvinylchloride compositions having superior properties to those heretofore produced and sold in the market.

In accordance with the invention it has now been found that significantly improved products of postchlorinated polyvinylchloride are obtained by intimately mixing together about 20 to about 90% postchlorinated atactic polyvinylchloride (chlorine content between about 58 and about 68%) and about 80 to about 10% post-chlorinated eutactic polyvinylchloride (chlorine content between about 58 and about 68%), possibly with other working adjuvants, such as stabilizers, lubricants, fillers, and the like.

In accordance with a preferred embodiment of the invention, a plastic mixture which is particularly adapted for industrial purposes consists of postchlorinated atactic polyvinylchloride with which between about 10% and about 30% of postchlorinated eutactic polyvinylchloride has been mixed.

The plastic mixtures can be worked by the conventional methods, and also with the addition of the conventional working adjuvants such as thermal stabilizers and lubricants, as well as with the addition of pigments and fillers. Molded bodies, sheets, filaments or the like can be made having advantageous properties derived from those of the plastic mixtures.

The following examples are given in order to more clearly disclose the nature of the present invention. It should be understood, however, that the example is not intended to be a limitation on the scope of the invention.

Starting materials:

Postchlorinated atactic polyvinyl chloride was prepared by the chlorination of suspension polyvinyl chloride (prepared at +55° C. with peroxide catalysts, dryblend type). The chlorination was conducted in aqueous 20% HCl, with chloroform as the swelling agent, and using ultraviolet light.

Postchlorinated eutactic polyvinyl chloride was manufactured by an analogous procedure but using eutactic polyvinyl chloride. The production of eutactic polyvinyl chloride can be conducted, for example, according to the disclosures of German "Auslegeschrift" Numbers 1,133,130 and 1,144,483, French Patent 1,261,690 and Japanese Patent 16,591.

Example 700 g. postchlorinated eutactic polyvinylchloride was thoroughly mixed with 20 g. barium-cadmium stearate, 3.5 g. calcium stearate, 14 g. E-wax (lubricant). The mixture was worked on a roller mixer for a period of 10 minutes to form a roller skin. The still hot skin was pressed within 3 minutes at 190° C. into a 4-mm. thick plate. Mixtures of postchlorinated eutactic polyvinylchloride with postchlorinated atactic polyvinylchloride, as hereinafter set out, were worked in a like manner. The characteristics of the resulting products are set out in the following table:

TABLE 1

| | | | | | | | | |
|---|---|---|---|---|---|---|---|---|
| Postchlorinated eutactic PVC, percent | 100 | 80 | 60 | 40 | 30 | 20 | 10 | 9 |
| Postchlorinated atactic PVC, percent | 0 | 20 | 40 | 60 | 70 | 80 | 90 | 100 |
| Tensile strength (kp./cm.$^2$) | 615 | 665 | 670 | 680 | 710 | 690 | 665 | 645 |
| Elongation (percent) | 2 | 8 | 15 | 20 | 57 | 50 | 29 | 25 |
| Impact strength (cm. kp./cm.$^2$): | | | | | | | | |
| At +20° C | 17.3 | 80.5 | N.b. | N.b. | N.b. | N.b. | N.b. | N.b. |
| At ±0° C | 19.9 | 51.0 | 80 | 95 | N.b. | N.b. | N.b. | 85 |
| Vicat 5 kg. (° C.) | 109 | 108 | 108 | 107 | 107 | 107 | 107 | 108 |
| Chlorine content (percent) | 62.1 | | | | | | | 63.8 |

It is apparent from the table that the mixtures have improved tensile strengths, elongations, and impact toughnesses (particularly at low temperatures) than do the individual components. The thermal stability (Vicat) is not affected or is affected only slightly.

The same results in principle were obtained on mixing post-chlorinated atactic polyvinyl chloride with post-chlorinated eutactic polyvinyl chloride when the latter showed a greater difference in their thermal stabilities (Vicat). The thermal stabilities of the two products add to one another in an approximately linear manner under these conditions. The results obtained with such mixtures are summarized in Table 2.

TABLE 2

| | | | | | |
|---|---|---|---|---|---|
| Postchlorinated eutactic PVC, percent | 100 | 30 | 20 | 10 | 0 |
| Postchlorinated atactic PVC, percent | 0 | 70 | 80 | 90 | 100 |
| Tensile strength (kp./cm.$^2$) | 615 | 680 | 730 | 700 | 665 |
| Elongation (percent) | 2 | 25 | 25 | 25 | 25 |
| Impact strength (cm. kp./cm.$^2$): | | | | | |
| At +20° C | 17.3 | N.b. | N.b. | N.b. | N.b. |
| At ±0° C | 19.9 | N.b. | N.b. | N.b. | 70 |
| At −20° C | 20.7 | N.b. | N.b. | N.b. | 64 |
| At −40° C | | N.b. | N.b. | 120 | 54 |
| Vicat 5 kg. (° C.) | 109 | 113 | 117 | 118 | 120 |
| Chlorine content | 62.1 | | | | 65.9 |

In the tables, "N.b." signifies not broken, which corresponds to a value greater than 150 cm. kp./cm.$^2$.

The after-chlorinated atactic polyvinyl chloride contains at least 75% 1,2-dichloroethylene units. As to the after-chlorinated eutactic polyvinyl chloride the chlorine atoms in the eutactic polyvinyl chloride used for the after-chlorination run along the chain in a 55–85% syndiotactic position.

We claim:
1. A composition of matter comprising about 20 to about 90% postchlorinated atactic polyvinylchloride having a chlorine content of between about 58 and about 68% and about 80 to about 10% postchlorinated eutactic polyvinylchloride having a chlorine content of between about 58 and about 68%.
2. A composition of matter according to claim 1, comprising 10 to 30% postchlorinated eutactic polyvinylchloride and 90 to 70% postchlorinated atactic polyvinylchloride.
3. A composition of matter according to claim 1, additionally containing at least one member selected from the group consisting of stabilizers, lubricants, and fillers.
4. The process of improving the mechanical properties such as tensile strength, elongation, and impact strength of plastic mixtures on the basis of postchlorinated atactic polyvinylchloride having a chlorine content of between about 58 and about 68% which comprises adding to said postchlorinated atactic polyvinylchloride from 10 to 30% referred to the total composition of postchlorinated eutectic polyvinylchloride having a chlorine content of between about 58 and about 68%.

References Cited

UNITED STATES PATENTS 3,167,598   1/1965   Heaps et al. _____ 260—891

FOREIGN PATENTS 626,843   1/1963   Belgium.

MURRAY TILLMAN, Primary Examiner.

J. L. WHITE, Assistant Examiner.